(No Model.)

J. A. WAKEFIELD.
APPLIANCE FOR MOVING, RAISING, AND SUPPLYING WATER.

No. 342,405. Patented May 25, 1886.

Witnesses:
Phil C. Dietrich
E. H. Reeves

Inventor:
John A. Wakefield
by A. B. Webb
Attorney.

UNITED STATES PATENT OFFICE.

JOHN A. WAKEFIELD, OF PLANO, IOWA.

APPLIANCE FOR MOVING, RAISING, AND SUPPLYING WATER.

SPECIFICATION forming part of Letters Patent No. 342,405, dated May 25, 1886.

Application filed December 22, 1884. Serial No. 150,992. (No model.)

*To all whom it may concern:*

Be it known that I, JOHN A. WAKEFIELD, a citizen of the United States, residing at Plano, in the county of Appanoose and State of Iowa, have invented certain new and useful Improvements in Appliances for Moving, Raising, and Supplying Water; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to appliances for moving, raising, and supplying water into a tank or trough for drinking, watering stock, and other useful purposes.

The object of my improvement is to furnish a cheap and simple means, not liable to get out of order, for conducting the flow of water in the direction and to the position desired. These results are attained by the means illustrated in the accompanying drawings, making part hereof, and in which the same letters denote the same parts throughout the different views.

Figure 1:
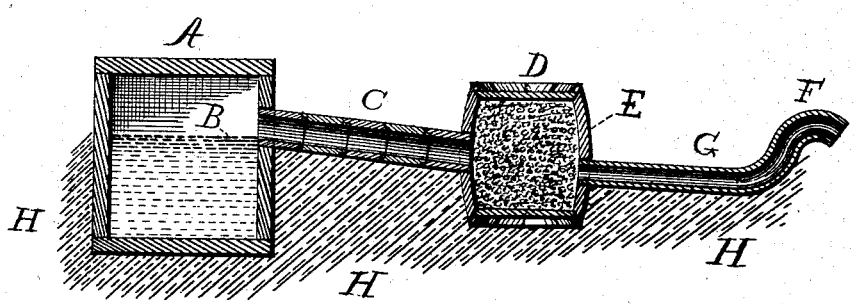
Figure 2:
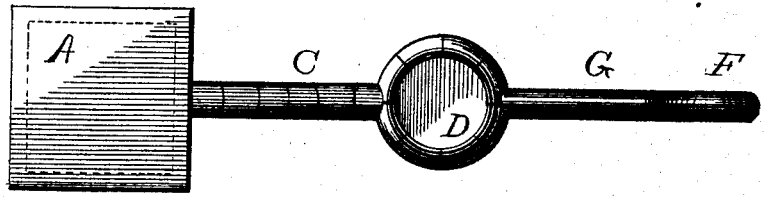

Figure 1 is a longitudinal section giving an inside view of the construction. The entire body of the appliance is located in a trench, H. Fig. 2 is a top view of the appliance without reference to the trench.

In Fig. 1, A represents a box placed in the ditch H, for the purpose of catching water to serve as a "head," and to prevent mud entering the inclined tiling C, that enters into and connects with barrel D, containing gravel E.

G is an inclined conduit with an upward curve, F, through which the water is forced or raised to a level with its head at box A, and is deposited in any receiver that may be necessary.

The gravel E is placed in the barrel D, to serve as a filter; but I do not confine myself to gravel, as any purifying ingredients can be used with the best of results in case the water is used for drinking purposes.

The advantages derived from the use of my appliance is, first, instead of digging a well for the purpose of a fountain-head, I simply dig in a suitable place deep enough to sink my box A; second, any foreign substance that may enter the tiling C is prevented by the gravel E (or other ingredients) in barrel D from going farther, and the water is delivered pure.

I am aware that filters have been constructed of vessels—such as barrels—the same being supplied with a false foraminous bottom on which is supported the filtering media, the water-inlet being at the bottom of the barrel or between it and the false bottom, and the outlet being at or near the top, thus causing the water to enter the vessel near its bottom, flow through the filtering media, and leave the vessel near the top. Filters have also been made within a cubical-shaped casing having perforated sides, the same being designed to be placed at the bottom of a well in such a manner as to cause the percolation of the water therethrough as it rises in the well. Filters have also been constructed in which the vessel containing the filtering media is divided into two compartments, the one of which is supplied with water from any suitable source, the other being the filtering-chamber, through which the water passes from the first-named chamber on its way to a cistern or receiving-vessel. The above-named devices are essentially different from mine, as I first make a ditch, then place a box therein to catch the water which would otherwise collect in the ditch, thereby preventing mud or such like foreign matters gaining access to the body of water collecting within said box; second, at a distance from the said box, I place a barrel or other suitable vessel containing a filtering media, the filter and box being connected by an inclined conduit; third, conducting said water from the filter by a downwardly-inclined conduit having an upwardly-extending discharge end to raise the water nearly to a level of the water in the receiving-box.

Having thus described my invention, what I claim as my invention, and desire to secure by Letters Patent, is—

The herein-described means for procuring pure water in low lands, consisting of the combination of a submerged receptacle or pervious material forming a fountain-head, a submerged filter located at a distance therefrom, a downwardly-inclined pipe connecting the receptacle and filter, and a downwardly-inclined pipe having an upwardly-curved discharge end connecting with said filter to convey the water therefrom, substantially as and for the purpose set forth.

In testimony whereof I have affixed my signature in presence of two witnesses.

JOHN A. WAKEFIELD.

Witnesses:
LLOYD WAILES,
G. G. WAKEFIELD.